United States Patent [19]

Pietzcker

[11] Patent Number: 4,799,540
[45] Date of Patent: Jan. 24, 1989

[54] HEAT EXCHANGER

[76] Inventor: Dirk Pietzcker, Niederwaldstr. 5, D-3500 Kassel, Fed. Rep. of Germany

[21] Appl. No.: 68,941

[22] Filed: Jul. 1, 1987

Related U.S. Application Data

[62] Division of Ser. No. 771,630, Aug. 30, 1985, Pat. No. 4,692,979.

[30] Foreign Application Priority Data

Aug. 31, 1984 [DE] Fed. Rep. of Germany ....... 3432073

[51] Int. Cl.[4] .............................. F28D 1/04; F28F 7/00
[52] U.S. Cl. .................................... 165/76; 165/151; 165/181; 29/157.3 A
[58] Field of Search ................ 165/151, 171, 76, 181; 79/157.3 R, 157.3 A, 157.3 B

[56] References Cited

U.S. PATENT DOCUMENTS

| 1,821,702 | 9/1931 | Freeman | 165/133 |
| 1,910,486 | 5/1933 | Wagner | 165/133 X |
| 2,414,159 | 1/1947 | Modine | 165/151 |
| 3,159,213 | 12/1964 | Wurtz | 165/171 |
| 3,433,300 | 3/1969 | Pasternak | 165/151 |
| 3,603,384 | 9/1971 | Huggins et al. | 165/151 X |
| 4,586,563 | 5/1986 | Dubrovscy et al. | 165/151 |

Primary Examiner—Ira S. Lazarus
Assistant Examiner—Richard R. Cole

[57] ABSTRACT

The invention relates to a heat exchanger, especially for motor vehicles, which consists of a plurality of fins disposed in a parallel, spaced relationship, having openings and collars of oval or planar cross section adjoining the openings, and of a plurality of tubes of corresponding cross section disposed perpendicularly thereto and passing through the openings and collars. The tubes are joined to the fins by expanding their cross section after they have been inserted into the openings and collars thereby forcing their walls against the margins of the openings and collars.

9 Claims, 4 Drawing Sheets

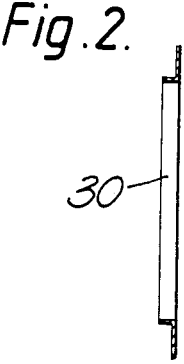
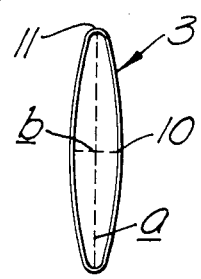
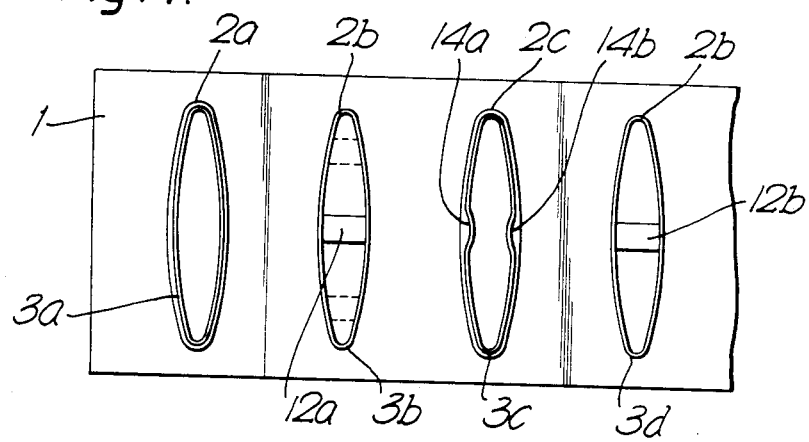
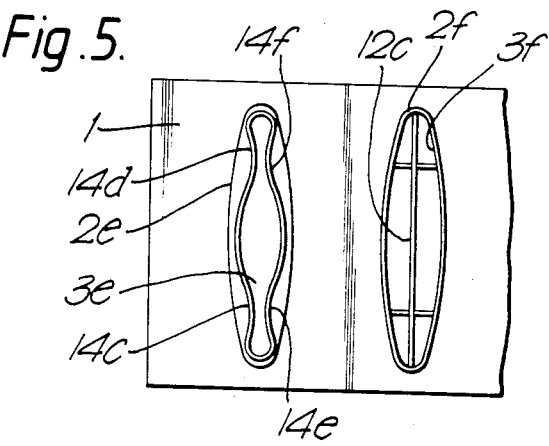

Fig. 8.
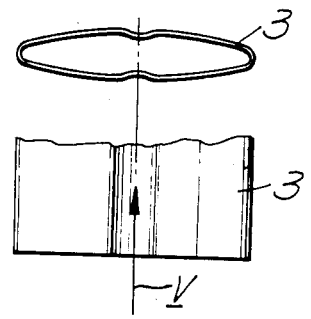
Fig. 6.
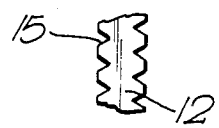
Fig. 7.
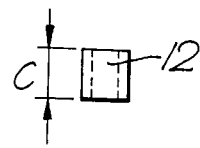
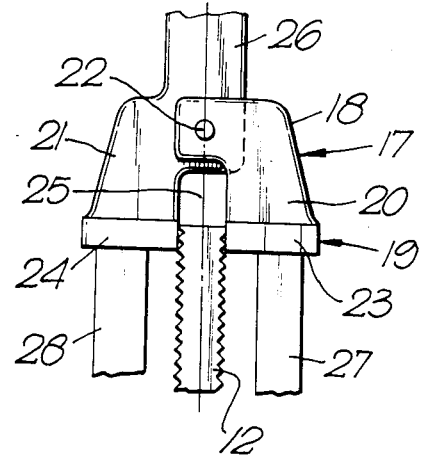
Fig. 9.
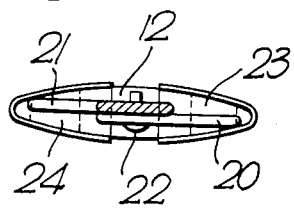

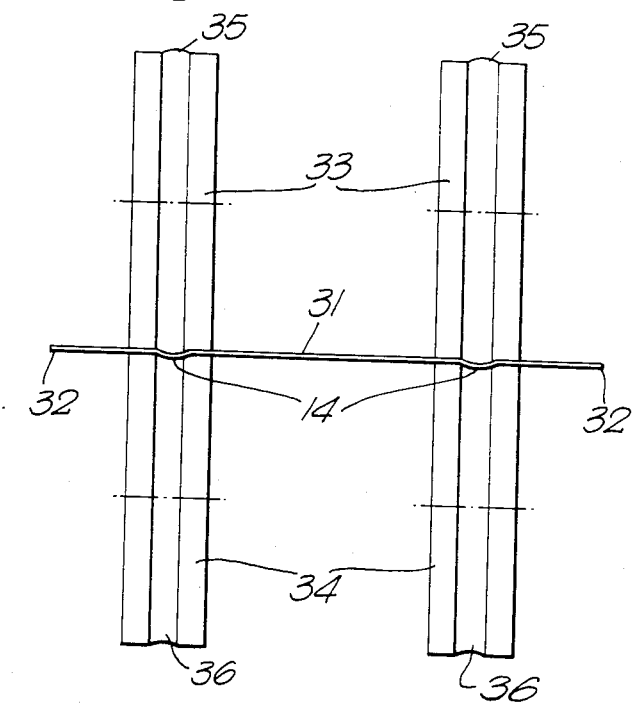
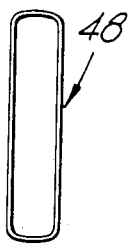
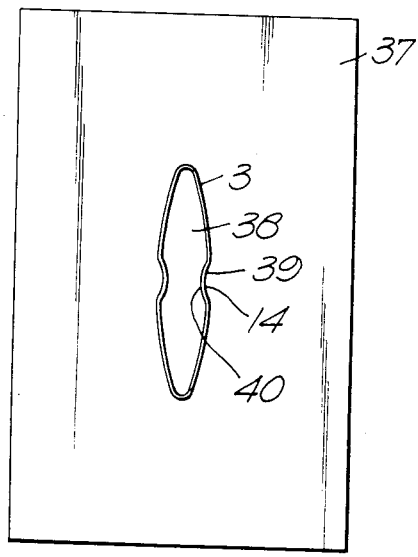
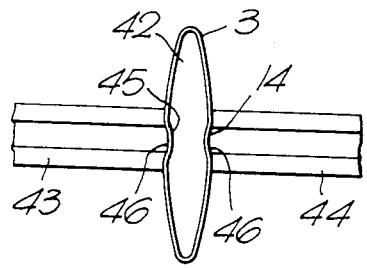

HEAT EXCHANGER

This is a division of application Ser. No. 771,630, filed Aug. 30, 1985, now U.S. Pat. No. 4,692,979.

Background of the Invention

The invention relates to a heat exchanger, especially for motor vehicles, which consists of a plurality of fins disposed in a parallel, spaced relationship, having openings and collars of oval or planar cross section adjoining the openings, and of a plurality of tubes of corresponding cross section disposed perpendicularly thereto and passing through the openings and collars. The tubes are joined to the fins by expanding their cross section after they have been inserted into the openings and collars thereby forcing their walls against the margins of the openings and collars.

Heat exchangers of this kind are a particular kind of tube radiator. They differ from conventional tube coolers in that the tubes are joined to the fins only by expanding their cross section and therefore they are not additionally soldered, welded or cemented to the fins. To be effective it is necessary that the tube walls be fully engaged with the edges of the openings or with the collars along their entire periphery, because otherwise the heat conduction is too greatly impaired. This full engagement is achieved when the tubes are expanded, by upsetting the collars of the fins slightly, and in the elastic and partially plastic range.

In the use of tubes of circular cross section, this type of joining is problem-free. But on account of the lack of streamlining it is not advantageous to use round tubes. Tubes of oval or flat-oval cross sections have the advantage of a streamlined shape. However, it has been possible only to a limited extent to assemble tubes of this kind by expansion. It is known, in the case of tubes of oval cross section, that the expanding technique can be used as long as the ratio of the longest diameter to the shortest diameter is not greater than about 4:1. Above this limit, however, the quality of the junctions produced by expansion decreases greatly, especially because the tubes collapse along their broad sides, even if they are expanded more strongly than in the area of their narrow sides. Aside from this, as in the case of round tubes, only tubes of relatively small longest diameters can be used, because otherwise the tubes would have to exceed considerably the wall thickness of about 0.4 mm, which, for reasons of cost, is about the maximum acceptable thickness. As a result, tubes of oval cross section, if they are to be joined to the fins by expansion, have heretofore been arranged basically in several planes.

Lastly, in the case of flat-oval tubes having two planar, parallelly disposed broad sides joined at their ends by semicylindrical sections, joining by expansion will not work at all.

The problem to which the invention is addressed is to create a heat exchanger of the kind identified above in which tubes can be used which, even with small wall thicknesses, have relatively great longest diameters and relatively small shortest diameters. In particular, a method for the manufacture of such heat exchangers is to be given whereby the tubes and fins of the heat exchanger can be joined together in a simple manner and good contact is achieved, especially between the walls of the collars and the walls of the tubes. Lastly, an apparatus is also to be proposed, which will be suitable for the series production of the heat exchangers according to the invention.

THE INVENTION

Two methods are proposed according to the invention for the solution of this problem. In the one method the tubes are provided, before expansion, with at least one corrugation, and then the expansion of the tube is performed by pressing out the surplus material contained in the corrugations. The second method, instead, provides for expanding the tubes essentially by plastic deformation, while at the same time preventing collapse of the tubes after expansion in any case by introducing spacers into the tubes, which support the tube walls at least in the area of their broad sides and have a width corresponding to the expanded tube cross section at this point.

The heat exchangers according to the invention are characterized in that spacers having a width corresponding to the expanded tube cross section are inserted into the tubes at least in the area of their broad sides.

Lastly, the apparatus according to the invention is characterized by having an expanding tool intended for running through the tubes, which is provided with a system for coupling the spacers.

The invention offers the advantage that, after their expansion by plastic deformation, the tubes are maintained by the spacers with the cross section produced by the expansion. This prevents collapse of the tubes in the critical areas of minimum curvature even when the selected ratio of the longest to the shortest diameter is comparatively large. If the tubes are joined to the fins by the pressing out of corrugations, the use of spacers is often even unnecessary.

Additional advantageous features of the invention will be found in the subordinate claims.

The invention will now be further explained through embodiments in conjunction with the appended drawing.

SUMMARY OF THE DRAWINGS

FIG. 2 is a cross section taken along line II—II of FIG. 1 through a single fin of the heat exchanger in the area of an opening, FIG. 3 is a top plan view of a single tube of the heat exchanger, FIG. 4 is a top view of a section of a single fin of the heat exchanger of FIG. 1 showing two embodiments of the tube before and after expansion, FIG. 5 is a view similar to FIG. 4 of a third embodiment of the tubes, FIGS. 6 and 7 are front and top views, respectively, of a spacer of the heat exchanger of FIG. 1, FIG. 8 represents diagrammatically a tool for expanding the tube of FIG. 3, FIG. 9 is a top view of an expanding tool with spacer according to FIG. 8, and FIGS. 10 to 12 represent diagrammatically the production of tubes with corrugations or fluting, and FIG. 13 is a cross section similar to FIG. 2 through another embodiment of a single fin.

DESCRIPTION OF PREFERRED EMBODIMENTS

Figure 1:
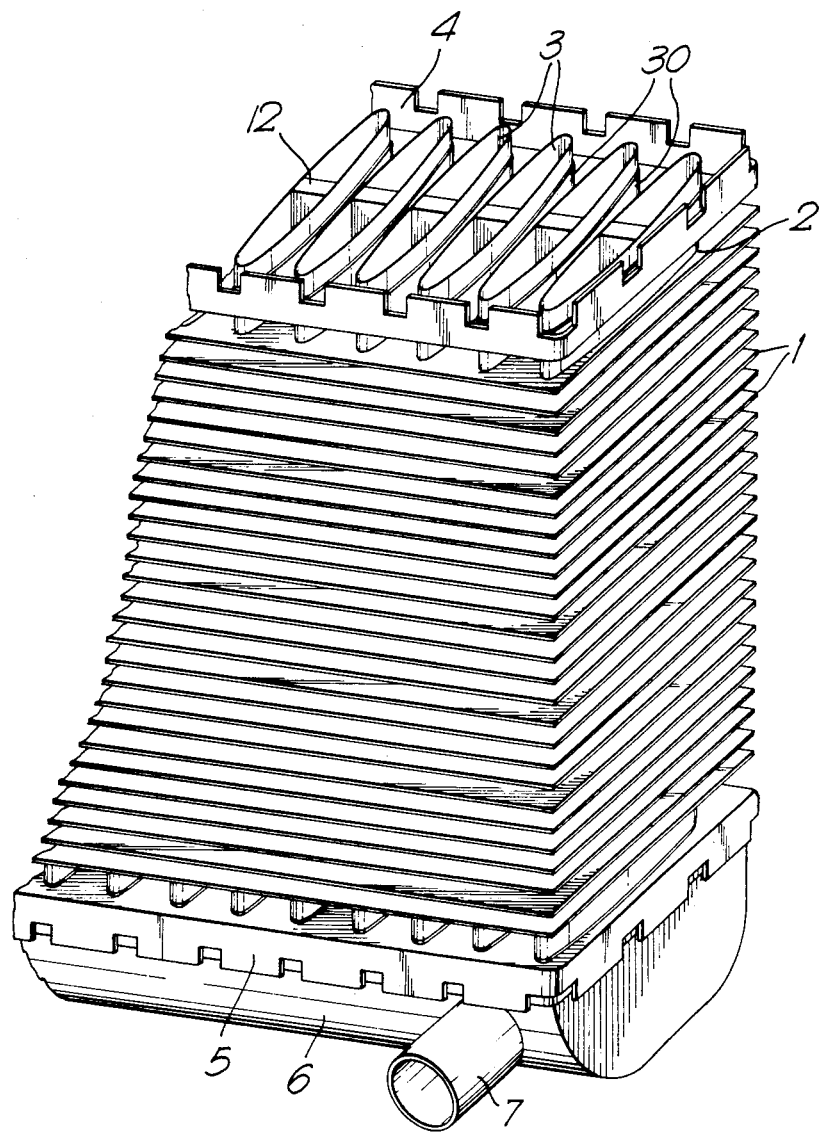
FIG. 1 is a perspective representation of a heat exchanger according to the invention, having a plurality of tubes.

The heat exchanger represented in FIG. 1 is constructed in the manner of a conventional tube radiator. It contains a number of parallel, flat fins or ribs 1 in a parallel, spaced relationship, each having a series of oval openings 2 which, when the fins are stacked, are disposed coaxially.

The margins of the fins 1 defining the openings 2 are prolonged by collars 30 coaxial with the openings (FIG. 2). Tubes 3 disposed perpendicular to the fins 1 pass through the openings 2 and collars 30, the tubes having an oval cross section corresponding to the cross section of the openings 2 and collars 30. The top and bottom ends of the tubes 3 extend through corresponding openings in end plates 4 and 5, respectively, and are soldered, welded, cemented or mechanically tightly bonded on their entire circumference to the edges of these openings in a liquid and gas-tight manner. To the bottom end plate there is fastened the usual tank 6 which has a connection 7 for the inlet and outlet of the medium flowing through the tubes 3, such as water, for example. A similar tank is connected to the upper end plate 4, but it is not shown. Between the fins 1 conventional turbulators can be provided, through which another medium, such as air, can flow.

FIG. 3 shows a single tube 3 of the heat exchanger of FIG. 1. The tube 3 has an oval cross section whose longest diameter a amounts to, for example, 39 mm, and whose shortest diameter b is 8 mm, for example. The wall thickness of the tube 3 amounts, for example, to 0.4 mm. Otherwise, the tube 3 has two opposite broad sides 10 which are curved with a relatively great radius of curvature, and which adjoin two opposite narrow sides 11 whose radii of curvature are relatively small.

FIG. 4 shows a portion of a fin 1 with four of the openings 2a to 2d, whose shape corresponds to the external cross section of tubes 3a to 3d, but in part have a slightly larger cross section than the latter. For example, the cross section of the opening 2a is so great over its entire circumference that approximately one-tenth of a milimeter of clearance is left between the edge of the opening and the tube 3a when the latter is inserted into the opening 2a.

To join the fins 1 to the tubes 3, the latter are first placed in the openings 2. In FIG. 4, this is represented by way of example by a tube 3a passing through the opening 2a. Then, by means of an expanding tool, which is pulled or pushed through the inside of the tube 3a, the tube 3a is expanded to its full cross section, until it fully engages the edge of opening 2 and the corresponding collar on all sides, as shown in FIG. 4 in the case of a tube 3b and the opening 2b. The deformation of the tube 3b is performed in the plastic range and is so great that the edge of fin 1 or of the collar surrounding the opening 2b is at least slightly deformed elastically, so as to be given an elastic contact pressure after the expanding operation.

In accordance with the invention, at least one spacer 12a, in the form of a rod whose width c (FIG. 6) corresponds precisely to the distance between the two broad sides 10 of tube 3b after expansion, is pushed after the expanding tool. This assures that, after the expanding tool has passed through, the expanded tube 3b will not shrink back, i.e., will not contract parallel to the shortest diameter b and thus create a gap detrimental to thermal transfer between the broad sides 10 and the corresponding sections of the edge of the opening or collar.

Although in FIG. 4 only a single spacer 12a is represented, in the central plane of which lies the smallest diameter b, two or more spacers 12a per tube can be provided, as indicated in broken lines for tube 3b. The number of spacers needed depends on the individual case, and especially also on the size of the tubes used.

The spacers 12a serve to assure the desired contact pressure of the two broad sides 10 against the edges of the openings 2 or collars 30. In the area of the narrow sides 11, no spacer is normally necessary, because their radii of curvature are so small that the individual wall sections can be supported by one another even after deformation, without shrinking parallel to the greatest diameter a.

According to a preferred embodiment of the invention, before the tube is introduced into the openings 2 or collars 30, the tube has a slightly smaller cross section than the opening and has at least one groove or flute 14 in each of its broad sides, as indicated in FIG. 4 in the case of a tube 3c inserted into the opening 2c. The flutes 14 are disposed, for example, in the middle of the broad sides 10 and extend over the entire length of the tube. Both of the flutes 14 are furthermore made by external indentation. By this measure a mathematically calculable, geometrically defined supply of material is created for the circumference of the tube. The tube 3c is treated with the expanding tool like the tube 3a, so that it ultimately assumes the shape which is represented in FIG. 4 in the form of the tube 3d passing through the opening 2d. The drawing in of a spacer 12b is performed in like manner, so that the tubes 3b and 3d hardly differ from one another externally in the finished state.

In contrast to the tubes 3a and 3b, in the case of the tubes 3c and 3d provision is made prior to the expanding process for a defined enlargement of the circumference of the tube that is to be expanded. The circumferential enlargement that is to be achieved by the expansion therefore need not be accomplished, or need not be accomplished only, by stretching the tube walls, since the material that is in the flutes 14 increases the amount of tube wall material available for pressing against the edge of the opening. After the expansion the tubes 3d, like tubes 3b, will have a cross section that is slightly greater than the original cross section of the openings 2 and collars 30.

When the expanding tool passes through, the enlargement of the circumference of the tubes is obtained not merely by the direct action of the expanding tool itself, but also by the fact that the surplus material contained in the flutes 14 is pushed back out of the flutes by the expanding tool and migrates into the shallowly curved portions of the broad sides 10, while at the same time those parts of the broad sides 10 which are more deeply curved are forced outwardly. In this manner it is brought about to a still better degree that the tubes when expanded are pressed reliably against the edges of the opening on their entire circumference and do not shrink back again after the expansion. For on the one hand the amount of extra material contained in reserve in the flutes can be made such that, after the passage of the expanding tool, the tube is pressed tightly against the edges of the openings or collars and the latter are also slightly deformed elastically. On the other hand, any contraction of the tubes where they cannot be backed by the spacers 12 is hardly possible, since the curvatures are given and there is no apparent reason for them to fall back, especially when the flutes are of such proportions that precisely the desired tube cross section is achieved by the expansion without the occurrence of any plastic deformation.

In the embodiment represented in FIG. 5, tubes 3e are provided on each broad side with two flutes 14c, 14d, 14e and 14f, the flutes 14c and 14e being disposed close to the one narrow side and the flutes 14d and 14f close to the other narrow side of the tube 3e. The flutes 14c to 14f extend over the entire length of the tube and are indented from the outside. The flutes form a defined reserve of material such that the cross section of tubes 3e prior to introduction into the openings 2e is smaller than the cross section of the latter. After the expansion of the tubes 3e, as represented in the case of a tube 3f in the right part of FIG. 5, the tubes instead have a slightly larger cross section than corresponds to the original cross section of the opening 2e, so that the tubes firmly engage the edges of the openings or of the collars on all sides and provide the intimate contact with them which is important for good thermal transfer. In contrast to FIG. 4, furthermore, spacers 12c are preferably introduced into the tubes 3f; these spacers have a wide web running parallel to the largest diameter a and two narrow webs running parallel to the smallest diameter b; the narrow webs support the tube walls where the flutes 14c to 14f originally were. If necessary, the thickness of the wider web can be selected such that its two edges engage the tube wall in the area of the narrow sides and support the narrow sides too and prevent them from falling back.

The rod-like spacers 12a and b are shown in two views in FIGS. 6 and 7. Their length corresponds substantially to the tube length, while their dimension measured parallel to the longest diameter a of the tubes 3 is on the one hand to be sufficiently great to provide the desired support, but on the other hand should be kept as small as possible so as not to reduce unnecessarily the cross section of the tube that is open to flow. Furthermore, it is desirable that the wall sections 15 of the spacers 12 extending into the cavity of the tubes 3 be not straight but of a wavy shape or with sawtooth-shaped interruptions or the like; these wall sections 15 will thus serve as turbulators for the medium flowing through the tubes, and this is advantageous in view of the comparatively large flow cross sections. The spacers 12c can be configured accordingly, and as regards thermal transfer they have the advantage of the greater surface area.

FIGS. 8 and 9 show diagrammatically a system for the expansion of the tubes 3 and for the pulling in of the spacers 12, i.e., for joining the tubes 3 to the fins 1. This system has as its chief component an expanding tool 17 whose end for introduction into the tube has a wedge-shaped or conically shaped circumferential surface 17 serving as an insertion aid. An expanding section 19 following this circumferential surface 17 has the external cross section which the expanded tubes 3 are to have as their internal cross section.

To enable the spacers 12 to be introduced directly into the tube 3 during the expanding process, they are preferably designed for coupling to the rear end of the expanding tool 17. In a preferred embodiment, the expanding tool 17 consists, as shown in FIG. 8, of two parts 20 and 21 joined together by a joint 22 which, when the expanding tool 17 is introduced into the tubes 3, is best disposed substantially perpendicular to the central plane of tube 3 containing the longest diameter a and at the level of the smallest diameter b. Each of the two parts 20 and 21 is provided with a corresponding part 23 and 24 of the expanding section 19. The parts 20, 21, 23 and 24 have on their back ends cutouts which are opposite one another and form a receptacle 25 for the ends of the spacers 12. By swinging the two parts 20 and 21 apart, a spacer 12 can be gripped in the socket 25 or released. For the movement of the entire expanding tool in the direction of an arrow V, pulling or pushing rods 26, 27 and 28 can be joined to a forward section of at least one of the two parts 20 and 21—part 21 for example—and to the rear ends of parts 23 and 24, these rods being connected to corresponding parts of an apparatus that is largely automatic in operation and by means of which the expanding tool 17 is moved through one of the tubes 3 of a heat exchanger. This offers the advantage that the spacers remain gripped constantly and automatically between the two parts 20 and 21 and 23 and 24 during the passage of the expanding tool 17 through one of the tubes 3, because the parts 23 and 24 are guided on the tube walls in the clamping direction, so that no additional means are necessary for coupling the spacers 12 to the expanding tool 17. Aside from this, the arrangement is preferably such that the ends of the spacers 12 are gripped directly at the level of the effective circumferential surface of the two-part section 19 and the receptacle 25 runs all the way through perpendicular to the plane of the drawing in FIG. 8. This brings it about that the gripped ends of the spacers 12, in accordance with FIG. 9, form in each case a third part of the expanding tool 17 and the circumferential surfaces of the two parts 23 and 24 combine to form an altogether tripartite expanding section 19. To facilitate the sliding movement of the expanding section 19, and especially of the spacer 12 pulled after it, the contact surfaces in tubes 3 can be coated with a suitable lubricant. Furthermore, the apparatus by which the expanding tool is driven or drawn has preferably as many expanding tools as the heat exchanger has tubes 3, so that all tubes 3 can be expanded simultaneously.

The assembly of the heat exchanger according to the invention is to be performed in the following manner:

The end plates 4 and 5 as well as the fins 1 coming from the fin processing machine are stacked in proper order in a jig. Then the tubes 3 are introduced into the openings 2, for example by first aligning and clamping the tubes in a corresponding jig prior to assembly, and then the fins 1 coming from the processing machine are placed in the proper sequence with their openings 2 onto the tubes, e.g., by forcing them on or letting them drop on by gravity. Then the spacers 12 are coupled to the expanding tools 17 as shown in FIG. 6, and the latter are placed under the ends of the tubes to be expanded. It is also conceivable to place the expanding tools 17 over the other ends of the tubes and to stand the spacers 12 on the expanding tools 17, with supports on their length or with supports on the push rods 27 and 28.

By means of the pulling or pushing rods 26, 27 and 28, the expanding tools 17 are now moved through the associated tubes, the tubes being expanded on the one hand, and the spacers being simultaneously introduced on the other. After the expanding tools have reached the other ends of the tubes, their parts 20 and 21 are swung outwardly to release them from the installed spacers 12. Then the tube ends are soldered, welded or cemented to the end plates 4 and 5, and then the headers 6 are installed.

It is also possible to place the end plates 4 and 5 on the tube ends in a separate procedure and affix them by soldering, welding or cementing, and then install the headers 6.

The flutes 14 can be created in the tubes 3 in several ways. Three examples are represented diagrammatically in FIGS. 10 to 12.

In FIG. 10, a tube is made out of an initially flat band having two parallel longitudinal edges 32 and consisting, for example, of aluminum, and illustrated in an end view. In a manner known in itself, this band 31 is rolled or bent in one or several stages until it has the shape shown in FIG. 3. After this shaping operation, the band 31 is still not closed to form a tube 3, but still has a longitudinal slot formed by the two confronting longitudinal edges 32. This longitudinal slot, which is located, for example, in the area of a narrow side 11, is closed up in a final step by joining together the two longitudinal edges 32 by welding, soldering and/or folding.

The creation of a flute 14 is best performed, in this method of manufacture, at some point in time before the final joining operation. For this purpose the tube is passed through the gap between at least one pair of rollers 33 and 34 whose circumferential surfaces confront one another. The one roller 33 has on its circumference a bead 35, the other a matching groove 36. The two rolls 33 and 34 are at such a distance apart that the bead 35 enters the groove 36 leaving enough space for the thickness of the material of band 31.

To make a second flute 14, at least one second, similar pair of rollers can be provided. Depending on the arrangement in space, this pair of rollers can be disposed alongside the rollers 33 and 34 or can be offset from them in the working direction so that the band 31 passes successively first through one and then through the other pair of rollers. Furthermore, the rollers 33 and 34 can also be at an angle to the band 31, depending on the forming conditions, rather than as shown in FIG. 10.

In the embodiment indicated in FIG. 11, the tube is drawn seamlessly or pressed seamlessly in a known manner by means of a mandrel 38 inside of the tube and a drawing die 37 surrounding the outside of the tube. Unlike the tools used in the production of tubes with a plain circumference, the drawing die has on its inside surface two beads 39, while the mandrel 38 is provided with matching grooves 40, so that the flutes 14 are incorporated into the tube as it is drawn or pressed.

In the embodiment shown in FIG. 12, the flutes 14 are not created until after the completion of the seamless or seamed tubes 3. For this purpose the completed tubes 3, cut to the predetermined length, are passed through a tool which has a mandrel 42 and two rollers 43 and 44 disposed on diametrically opposite sides of the mandrel 42 and acting on the outer periphery of the tube 3. The mandrel 42, whose cross section corresponds substantially to the internal cross section of the tube 3, has two grooves 45 at the points at which the flutes are to be located, while the rollers 43 and 44 are provided with matching beads on their circumferential surface acting on the tube 3. When the tube 3 passes through the tool, therefore, the rollers 43 and 44 create the flutes 14, while at the same time the mandrel 42 supports the tube 3 from within. The mandrel 42 in this case can travel together with the tube or can remain fixed in relation to the rollers 43 and 44, so that the tube slides over it.

Lastly, a combination of the procedures described in conjunction with FIGS. 11 and 12 is possible. In this case, for example, a tube 3 of oval or flat oval cross section and a plain surface can be produced by means of a conventional pressing or drawing tool. The mandrel of the drawing tool is followed by a second mandrel having a profile like that of mandrel 42 in FIG. 12, and cooperates with a pair of rollers corresponding to rollers 43 and 44. Thus, in a first step, seamless tubes with a plain surface are produced, which then, in a second, immediately following step, are provided with flutes. An advantage of this procedure is that it permits the endless production of tubes having flutes 14.

The invention is preferentially applied to the production o aluminum radiators for the motor vehicle industry, but it can be used with the same advantages for the production of heat exchangers for other purposes and of other materials, such as steel, brass, copper, or combinations thereof. The spacers 12 can best consist of metal or plastic.

The amount of the expansion depends on the individual case, and will be, for example, one to two-tenths of a millimeter in the direction of each diameter, but in some cases a lesser expansion may be sufficient on the shorter diameter than in the direction of the longer diameter. The amount of the expansion should be selected especially such that not only the tube walls but also the surrounding edges of the openings or the collars will be expanded in the resilient and/or plastic range in order thereby to obtain an increased contact pressure.

The invention is not limited to the embodiments described, which can be modified in many ways. This is true not only in regard to the stated dimensions but also in regard to the shape of the tubes 3, since, instead of oval tubes, tubes 48 of a flat oval cross section as shown in FIG. 13 can be provided. Instead of spacers in the form of solid rods or rails, spacers can also be provided which have openings permitting exchange of fluid among the tube chambers separated by the spacers. The apparatus that has been described also is susceptible of many modifications. This applies especially with regard to the configuration of the expanding tool and the way it is coupled to the spacers. Instead of the embodiment shown in FIGS. 8 and 9, in which the two parts 23 and 24 are supplemented by one end of a spacer gripped between them to form the expanding section 19, provision can be made for making the confronting surfaces of the two parts 23 and 24 U-shaped such that their confronting faces abut one another upon passage through the tubes. In this case the two parts 23 and 24 alone would form the expanding section while the opening formed by the U-shaped parts 23 and 24 could act as a receiver for a projection of reduced cross section provided on the spacers so that the active part of the spacer would come to lie directly below the expanding section.

Lastly, it would be possible to couple the spacers to the expanding tool in an entirely different manner, for example by threading threaded projections on the spacers into a tap in a one-piece expanding tool.

Finally, the invention is not necessarily limited to tubes with spacers. If tubes of oval cross sections are used, and if use is made of the method of creating surplus material in the tubes prior to expansion, by providing flutes, it is instead also possible by the expansion operation alone to obtain a good bond between the tubes and the fins. In this case the use of spacers can be dispensed with in some cases, since after a fluted tube is expanded the danger of subsequent shrink-back is far less than in the case of a tube which is expanded without first making a flute in it.

What is claimed:

1. A heat exchanger comprising: a plurality of heat dissipating metal fins, said fins each having at least one oval or oblong shaped collar, said collars providing openings through said fins and having initial oval or oblong cross sections; at least one fluid conducting metal tube, said tube extending through the openings of said fins and having first similarly shaped wall portions at opposite ends of a major axis thereof and second similarly shaped wall portions at opposite ends of a minor axis thereof, and said tube being attached to said fins by merely at first providing said tube with outer cross section being similar but slightly smaller than said initial cross sections of said openings and by then expanding said tube into a plastically stretched condition and to a slightly greater cross section than said initial cross sections of said openings such that said collars are in an elastically expanded condition and thus pressed with elastical force against said tube; and at least one elongated spacer supporting said second wall portions at a preselected location thereof, said spacer extending through said tube, substantially having a breadth corresponding to the distance between said second wall portions at said preselected location in the plastically stretched condition of said tube, and preventing a shrink-back of said tube under the elastical forces of said collars.

2. A heat exchanger according to claim 1, wherein said preselected location is at the minor axis of said tube.

3. A heat exchanger according to claim 1, wherein said spacer supports said first and second wall portions.

4. A heat exchanger according to claim 1, wherein said spacer is designed as a turbulator.

5. A heat exchanger comprising: a plurality of heat dissipating metal fins, said fins each having at least one oval or oblong shaped collar, said collars providing openings through said fins having initial oval or oblong cross sections; and at least one fluid conducting metal tube, said tube having a longitudinal axis and extending through said openings of said fins and having first similarly shaped wall portions at opposite ends of a major axis thereof and second similarly shaped wall portions at opposite ends of a minor axis thereof; wherein said tube has a same shaped but slightly greater outer cross section than said initial cross sections of said openings; wherein said collars are in an elastically expanded condition and thus pressed with elastical force against said tube; and wherein said tube is permanently attached to said fins by merely at first providing said tube with an outer cross section slightly smaller than said initial cross sections of said openings, but with at least one flute in at least one of said surfaces, said flute being made by inwardly bending said at least one surface and being extended parallel to the longitudinal axis of said tube, by then inserting said tube into said openings and by then expanding said tube to permanently have said oval or oblong shape and said slightly greater cross section without substantial plastical stretching thereof but by widening the cross section thereof by pressing out said flute.

6. A heat exchanger according to claim 5 and further comprising at least one elongated spacer supporting said second wall portions at a preselected location thereof, said spacer extending through said tube, substantially having a breadth corresponding to the distance between said second surfaces at a preselected location in the expanded condition of said tube, and preventing a shrink-back of said tube under the elastical forces of said collars.

7. A heat exchanger according to claim 6, wherein said preselected location is at the minor axis of said tube.

8. A heat exchanger according to claim 6, wherein said spacer supports said first and second wall portions.

9. A heat exchanger according to claim 6, wherein said spacer is designed as a turbulator.

* * * * *